United States Patent [19]

Takami

[11] Patent Number: 4,685,348

[45] Date of Patent: Aug. 11, 1987

[54] GEAR TRANSMISSION

[75] Inventor: Akira Takami, Himeji, Japan

[73] Assignee: Mitsubishi Denki Kabushiki Kaisha, Tokyo, Japan

[21] Appl. No.: 860,035

[22] Filed: May 6, 1986

[30] Foreign Application Priority Data

May 17, 1985 [JP] Japan .................................. 60-106524
Dec. 5, 1985 [JP] Japan .................................. 60-275540

[51] Int. Cl.[4] .............................................. F16H 55/17
[52] U.S. Cl. ......................................... 74/437; 74/393
[58] Field of Search ................................... 74/393, 437

[56] References Cited

U.S. PATENT DOCUMENTS

| 2,239,313 | 4/1941 | Beschkine | 74/437 X |
| 2,983,154 | 5/1961 | Neukirch | 74/119 X |
| 3,098,399 | 7/1963 | Berthiaume | 74/437 X |
| 4,487,085 | 12/1984 | Collins | 74/117 X |

*Primary Examiner*—Kenneth Downey
*Attorney, Agent, or Firm*—Burns, Doane, Swecker & Mathis

[57] ABSTRACT

A gear transmission employing at least one pair of non-circular gears to form the intermeshing pitch curves so that one non-circular gear can be given the periodically variable number of rotations on the basis of the exponentially functional increasing mode or the same decreasing mode with respect to the rotational speed of the other non-circular gear, thereby obtaining a gear type continuously variable transmission.

5 Claims, 19 Drawing Figures

FIRST ROTARY SHAFT ANGULAR DISPLACEMENT θ (RADIAN)

FIRST ROTARY SHAFT ANGULAR DISPLACEMENT θ (RADIAN)

FIRST NON-CIRCULAR GEAR ANGULAR DISPLACEMENT $\theta$ (RADIAN)

FIRST NON-CIRCULAR GEAR ANGULAR DISPLACEMENT $\theta$ (RADIAN)

GEAR TRANSMISSION

BACKGROUND OF THE INVENTION

1. Field of the Invention

This invention relates to a gear type power transmission, and more particularly to an element device for obtaining a gear type continuously variable transmission.

2. Description of the Prior Art

Although there has been known a little mechanical continuously variable transmission mechanism achieved by using gears, of these mechanisms a rectangular wave-generating apparatus disclosed in Japanese Patent Publication No. 59-42181 (1984) seems to be a typical one example of an element device of mechanical continuously variable transmission mechanisms according to the prior art. It is disclosed in the above described Japanese Patent Publication that a continuously variable transmission can be composed of a plurality of sets of such rectangular wave-generating devices. However, one set of element devices of the conventional example comprises four non-circular spur gears and three bevel gears, that is to say seven gears in all and is based on the construction consisting of at least ten mechanical elements. Accordingly, with a continuously variable transmission using the above described set of element devices, a difficulty of the conventional continuously variable transmission is that a large number of constituent mechanical elements including specialized gears, such as non-circular gears and bevel gears, are required.

In general, a friction gearing is superior in smoothness of the rotary transmission while a non-friction gearing, such as a gear, is superior in transmission efficiency. However, in comparison with friction gearing, a conventional continuously variable transmission non-friction gears has a difficulty in that the construction is remarkably complex. Therefore, the transmission efficiency is reduced by inertia loss due to the constituent mechanical elements and the friction between the mechanical elements.

SUMMARY OF THE INVENTION

It is an object of the present invention to propose a new mechanism for achieving a geared continuously variable transmission or a device based on the new mechanism, in which the transmission deficiency itself has been known in the field of continuously variable transmissions. For example, a geared continuously variable transmission has been demanded for transmission systems of vehicles; however, a continuously variable transmission having such gearing has been regarded as being impossible to realize with the prior art.

In order to attain the above object, the gear transmission of the present invention employs at least a pair of non-circular gears which have intermeshing pitch curves, respectively, so that one non-circular gear is given the periodically variable number of rotation on the basis of the exponentially functional increasing mode or the decreasing mode with respect to the rotational speed of the other non-circular gear which is continuously engaged with the first non-circular gear.

The above and further objects and novel features of the invention will become apparent from the following description of the embodiments with reference to the accompanying drawings.

The above and further objects and features of the invention will more fully be apparent from the following detailed description with accompanying drawings.

DETAILED DESCRIPTION OF THE PREFERRED EMBODIMENTS

Figure 1:
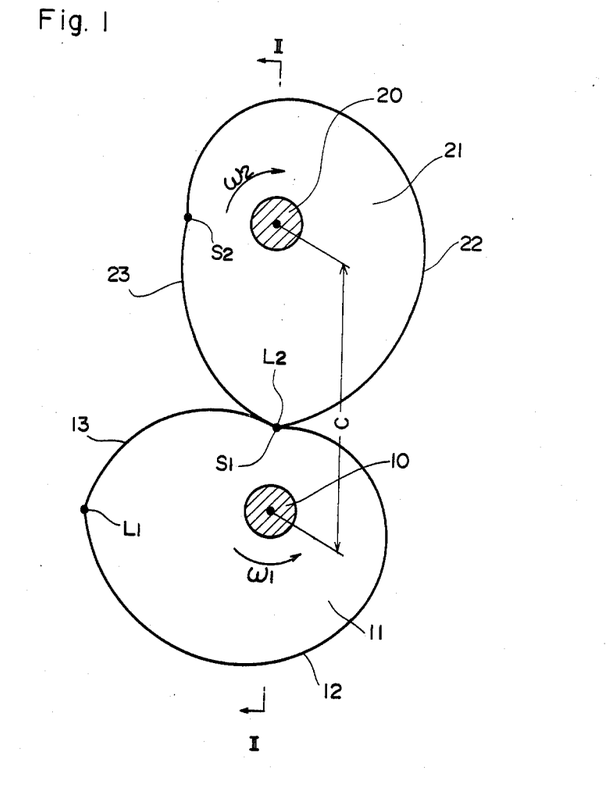
FIG. 1 is a plan view of an embodiment of a device of the invention.
Figure 2:
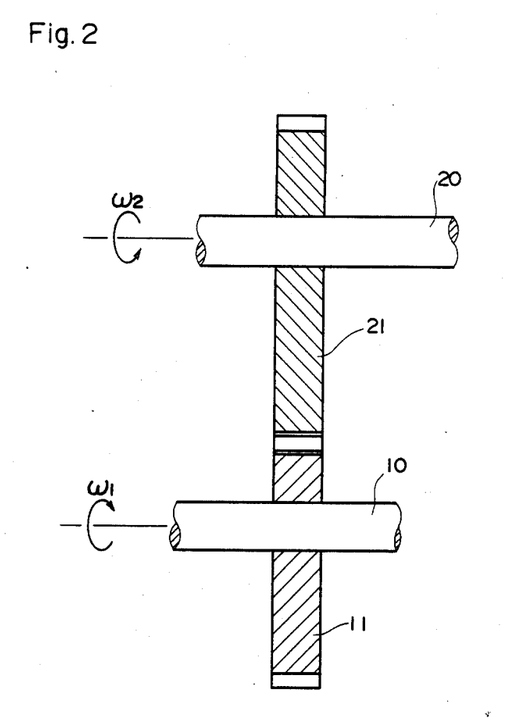
FIG. 2 is a sectional view taken on the line II—II in FIG. 1.

Next, explanation will be given on the preferred embodiments of the invention in accordance with the accompanying drawings. Referring to FIGS. 1 and 2, reference numeral 10 designates a first rotary shaft, 11 designates a first non-circular gear fixed to the first rotary shaft 10, 20 designates a second rotary shaft, 21 designates a second non-circular gear fixed to the second rotary shaft 20, the first and second rotary shafts 10 and 20 having therebetween a distance C of a fixed length determined by the distance between the engagement centers of the same, 12 designates an intermeshing pitch curve of the first non-circular gear 11 in the speed change mode, 13 designates an intermeshing pitch curve of the same in the return mode, and 22 and 23 designate intermeshing pitch curves of the second non-circular gear in the speed change and return modes. In addition, for example, the involute tooth is actually indented along each intermeshing pitch curve, but even when the involute tooth is omitted from the drawings for the convenience of explanation regarding the rotational speed or the transmissible torque, the intermeshing pitch curve is understandable without hindrance, thereby omitting the involute tooth.

The speed change mode intermeshing pitch curve 12 is formed from the point S1 to that L1 as shown and equal in total length to that of the speed change mode intermeshing pitch curve 22 formed from the point L2 to that S2 as shown. Also, the return mode intermeshing pitch curve 13 formed from the point L1 to that S1 is equal in total length to the return mode intermeshing pitch curve 23 formed from the point S2 to that L2. Thus, the first non-circular gear 11 is equal in the total number of teeth to the second non-circular gear 21.

Figure 3:
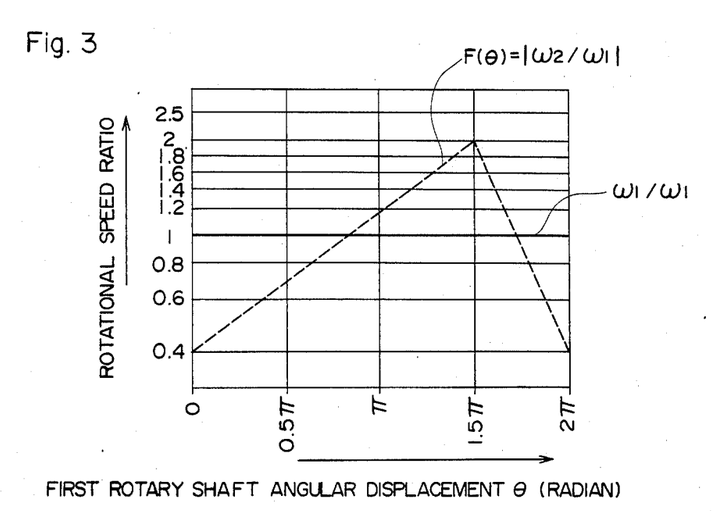
FIG. 3 is a graph explanatory of a rotational speed ratio of the embodiment in FIG. 1.

The gear transmission of the invention constructed as the above-mentioned is important in that it is characterized in the rotational speed to be discussed below. FIG. 3 is a graph showing a relation of the rotational speed between the first rotary shaft 10 and the second rotary shaft 20, in which the axis of abscissa expresses an angular displacement $\theta$ during the one-time rotation of the first rotary shaft 10. In addition, $\theta$ represents an angular displacement of the point S1 moving counterclockwise from the point shown in FIG. 1 being assumed as zero. The axis of ordinate expresses in logarithmic scale the absolute number value showing a ratio of the rotational speed with respect to the rotational speed of the first rotary shaft 10. When the rotational speed of the first rotary shaft 10 is expressed by $\omega 1$ and that of the second rotary shaft 20 by $\omega 2$ as the function of $\theta$, the rotational speed ratio between the first and the second rotary shafts of the gear transmission of the invention is represented by $F(\theta) = \omega 2/\omega 1$. Since the graph in FIG. 3 has a correlation with the shape of the non-circular gear in the FIG. 1 embodiment, the time period when the first non-circular gear 11 rotates by a $1.5\pi$ radian counterclockwise from the state in FIG. 1 so that the engaging point with the second non-circular gear 21 moves from the points S1 and L2 to those L1 and S2, is shown by the broken line sloped rightwardly upward. The engagement from the points S1 and L2 to those L1 and S2 is called the speed change mode engagement. The engagement subsequent from the points L1 and S2 to those S1 and L2 is called the return mode engagement. The gear transmission of the present invention is characterized in that the rotational speed ratio $F(\theta)$ at the speed change mode engagement, as shown in FIG. 3, is varied logarithmically with respect to the angular displacement $\theta$. When the ratio is algebraically expressed, a differential value K given in $K = d \log F(\theta)/d\theta$ represents the positive or negative constant differential value. Incidentally, in the FIG. 1 embodiment, K=0.342 radian$^{-1}$ is given.

Also, in the gear transmission of the invention as the above-mentioned, it is basically important to set the rotational speed ratio for a speed change mode side engaging portion. It is better for raising the application effect of the continuously variable transmission of the invention to be discussed below that the speed change mode side engaging portion is set at at least $\pi$ radian or more than $\pi$ radian, of the central angle of $2\pi$ radians of the first non-circular gear 11. Meanwhile, the rotational speed ratio at the return mode side engaging portion is not particularly defined. The return mode side engaging portion operates so that both the non-circular gears 11 and 21 are smoothly returned from one terminations: the points L1 and S2 to the other terminations: the points S1 and L2 in consideration of an amount of periodical speed change allowable in practical use and the treatment of inertia. In the FIG. 1 embodiment, K= $-1.025$ radian$^{-1}$ is merely assumed.

Figure 4:
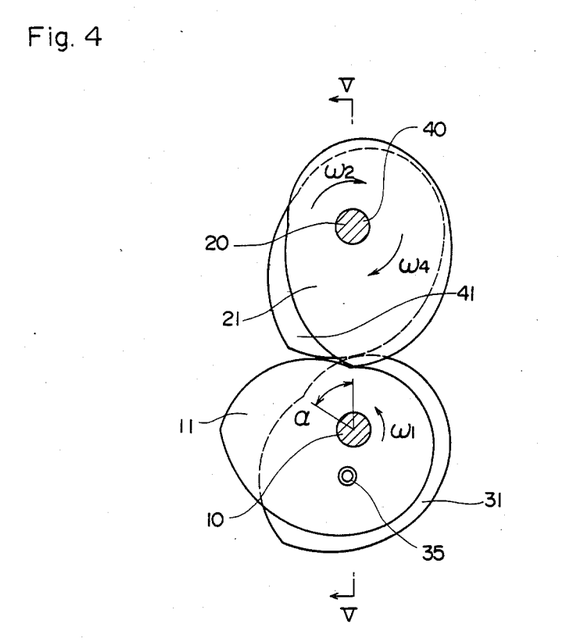
FIG. 4 is a plan view of an embodiment of a gear transmission applying the device of the invention.
Figure 5:
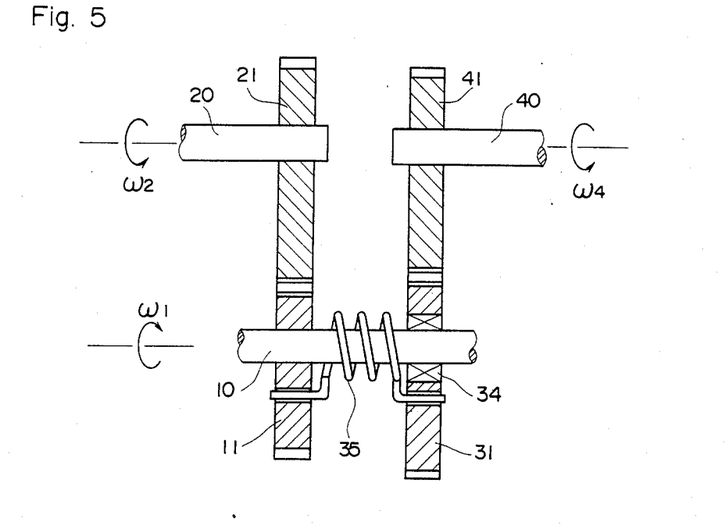
FIG. 5 is a sectional view taken on the line V—V in FIG. 4.

Particular property applicable to the gear transmission of the present invention appears in the relation of rotational speed between the first and second rotary shafts 10 and 20. Referring to FIGS. 4 and 5, a mechanism employing two pairs of the gear transmission of the present invention is shown. In FIGS. 4 and 5, reference numerals 10, 11, 20 and 21 designate the same components as those in FIGS. 1 and 2, 31 designates a third non-circular gear mounted on the first rotary shaft 10 through a bearing 34 and of the same shape as the first non-circular gear 11, 35 designates a torsional spring which decides transmissible torque between the first non-circular gear 11 and the third non-circular gear 31 and sets a rotational phase angle $\alpha$ between the first non-circular gear 11 and the third non-circular gear 31 in correlation with the transmission torque, 40 designates a fourth rotary shaft, and 41 designates a fourth non-circular gear fixed to the fourth rotary shaft 40 and of the same shape as the second non-circular gear 21.

Figure 6:
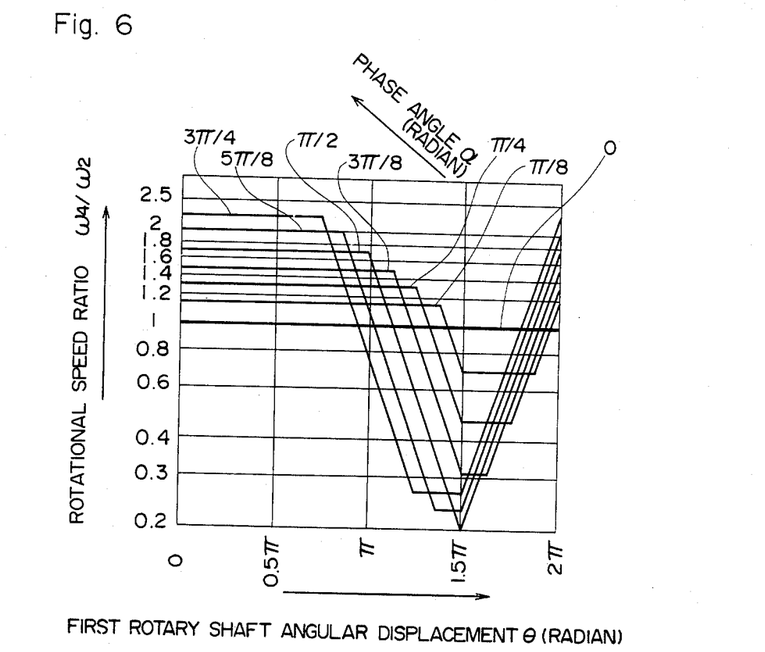
FIG. 6 is a graph explanatory of the rotational speed ratio of the embodiment in FIG. 4.

Referring to FIG. 4, it is important that the first and third non-circular gears 11 and 31, being mounted on the first rotary shaft 10, are given a phase variation in the central angle of $\alpha$ radian. When the rotational speeds of rotary shafts 10, 20 and 40 are represented by algebra $\omega 1$, $\omega 2$ and $\omega 4$ respectively and the relation therebetween are represented by the algebraic expressions, $\omega 1 = -\omega 2 \cdot e^{-K \cdot \theta} \cdot F(O)^{-1}$ and $\omega 4 = -1 \cdot e^{K(\theta + \alpha)}$. $F(O)$ are given, so that an equation of rotational speed of $\omega 4 = \omega 2 \cdot e^{K \cdot \alpha}$ is obtained from both the above equations. The equation $\omega 4 = \omega 2 \cdot e^{K \cdot \alpha}$ is of property applicable to the continuously variable transmission to be produced by the device of the invention. In addition, this property appears in the speed change mode side engaging period, and in other periods, a rotational speed ratio pattern depending on the formation of the return mode intermeshing pitch curves appears. FIG. 6 is a graph showing variation in the rotational speed ratio of the speed change mode time period including other time periods at the embodiment in FIGS. 4 and 5, and showing a change in the rotational speed ratio of $\omega 4/\omega 2$ when a controllable object is given as a variable value. Thus, the gear transmission of the invention is applied so that, in the region of engagement of the non-circular gears at the speed change mode side, a continuous constant value of the rotational speed ratio of $\omega 4/\omega 2$ appears and the variable speed change ratio in correlation with the phase angle $\alpha$ also appears.

Figure 7:
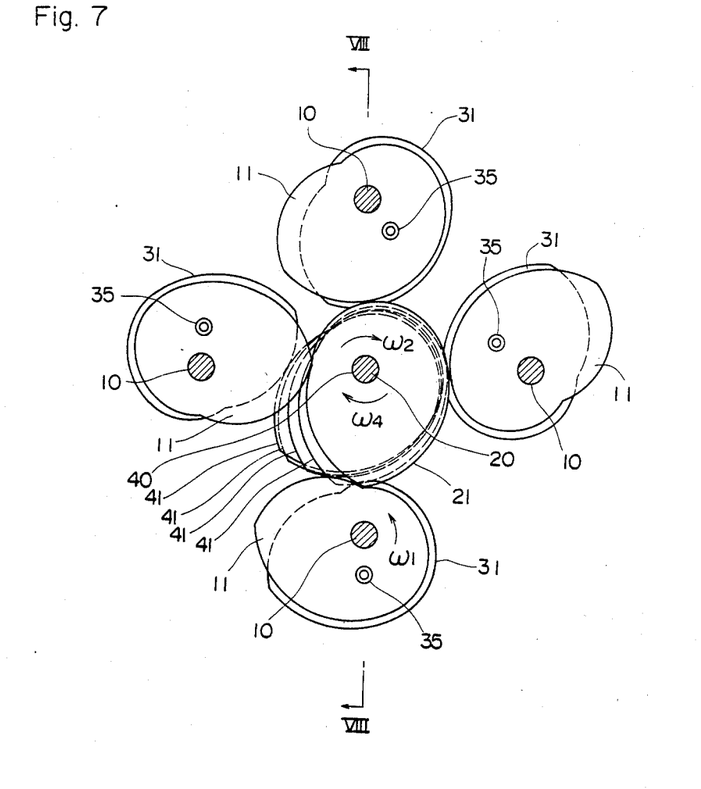
FIG. 7 is a plan view of a modified embodiment of the invention.
Figure 8:
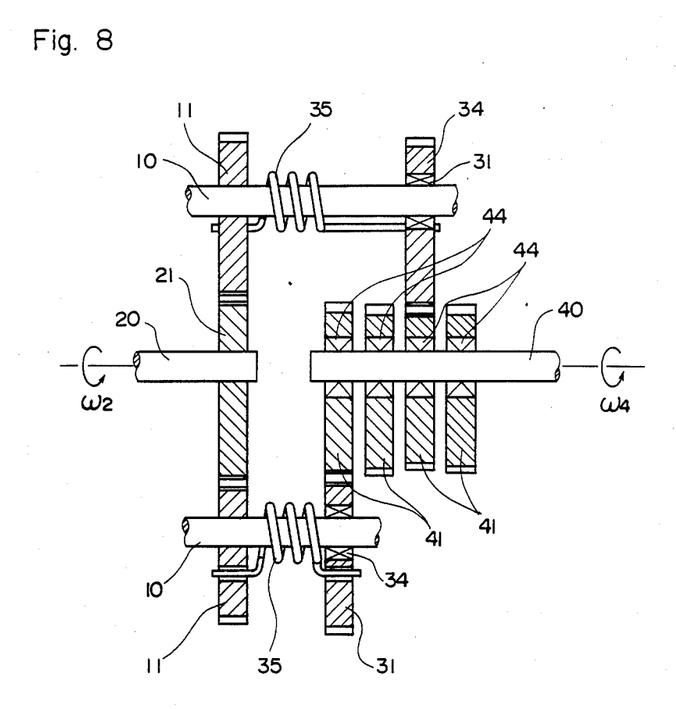
FIG. 8 is a sectional view taken on the line VIII—VIII in FIG. 7.

In order to construct an actual gear type continuously variable transmission by using the gear transmission of the invention, means for controlling the phase angle $\alpha$, means for picking up only the constant value portion from the variation pattern of the rotational speed change ratio, and means for devising continuous engagement of the gears to continue the rotation thereof by utilizing only the constant value portion, need only be adopted, these means including various combination mechanism. FIGS. 7 and 8 show an embodiment of the above, in which the phase angle $\alpha$ is controlled by each torsional spring 35 in correlation with the transmissible torque, a one-way clutch means 44 is used to pick up only the constant value portion from the variation pattern of the rotational speed ratio, and the four sets of rotary shaft corresponding to the first rotary shaft 10 are disposed around the common axis of the second rotary shaft 20 and fourth rotary shaft 40 in a planetary manner and in phase-shifting each by $\pi/2$, thereby utilizing only the constant value portion only to continue the rotations of the gears engageably.

Figure 9:
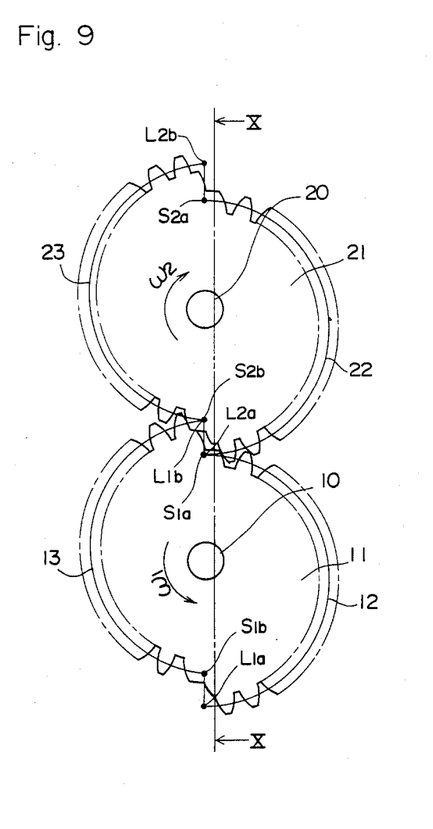
FIG. 9 is a plan view of another modified embodiment of the invention.
Figure 10:
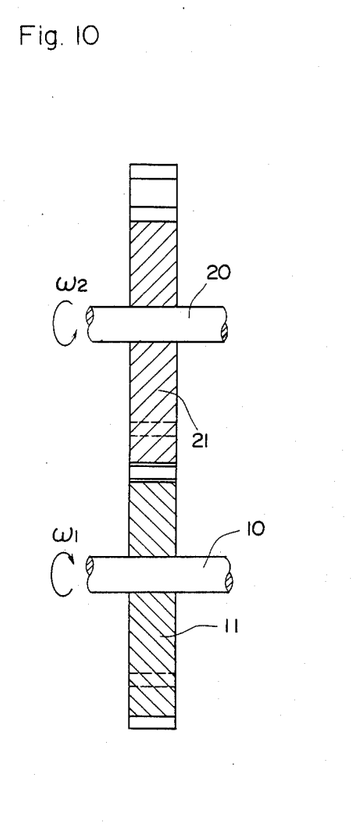
FIG. 10 is a sectional view taken on the line X—X line in FIG. 9.

Referring to FIGS. 9 and 10, a modified embodiment of the invention is shown, in which the same components as those in FIGS. 1 and 2 are designated by the same reference numerals.

In FIGS. 9 and 10, intermeshing pitch curves 12 and 13 are formed from point S1a to that L1a and from the point S1b to that L1b, intermeshing pitch curves 22 and 23 being formed from the point L2a to that S2a and from the point L2b to that S2b, the intermeshing pitch curves 12 and 13 being equal in total length to the intermeshing pitch curves 22 and 23. Thus, the total number of teeth of the first non-circular gear 11 is equal to that of the second non-circular gear 21.

Figure 11:
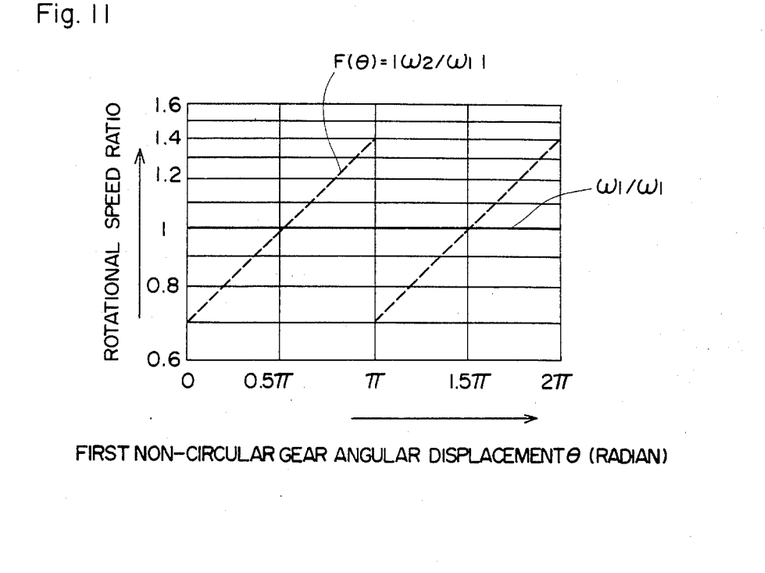
FIG. 11 is a graph explanatory of the rotational speed ratio of both the gears with respect to the displacement of the first non-circular gear shown in FIG. 9.

The non-circular gear transmission of the present invention constructed as the above-mentioned is important in the characteristic as to the rotational speed to be discussed below. FIG. 11 is a graph showing the relation between the rotational speeds of the first and second non-circular gears 11 and 21, in which the axis of abscissa represents the scale of an angular displacement $\theta$ during the once counterclockwise rotation of the first non-circular gear 11, and the state shown in FIG. 9, that is, the state where the gears intermesh with each other at the points S1a and L2a, is set at zero. The axis of ordinate represents in logarithmic scale the rotational speed ratio of the second non-circular gear 21 to the first non-circular gear 11.

When the rotational speed of the first non-circular gear 11 is represented by $\omega1$ and that of the second non-circular gear 21 $\omega2$ as the function of $\theta$, a rotational speed ratio between the first and second non-circular gears 11 and 21 is given in the expression $F(\theta)=\omega2/\omega1$. In the FIG. 11 graph, the broken line extending rightwardly upward at the left side represents the state where the first non-circular gear 11 rotates in # radian counterclockwise from the state shown in FIG. 9 and the engaging points S1a and L2a with the second non-circular gear 21 shift to the points L1a and S2a, the same broken line as the above at the right side representing the state where the first non-circular gear 11 rotates further in $\pi$ radian.

The device of the invention is characterized in that a logarithmic value of the rotational speed ratio $F(\theta)$, as shown in FIG. 11, is varied in linear proportion to the angular displacement value $\theta$. In a case of the FIG. 11 embodiment, when the logarithmic values are represented algebraically, a differential value K given by $K=d \log F(\theta)/d\theta$ represents the constant value. Incidentally, the FIG. 9 embodiment adopts $K=0.2206$ radian$^{-1}$.

In the relation between the rotational speeds of the first and second non-circular gears 11 and 21, the particular property applicable to the continuously variable transmission appears as the above-mentioned.

Figure 12:
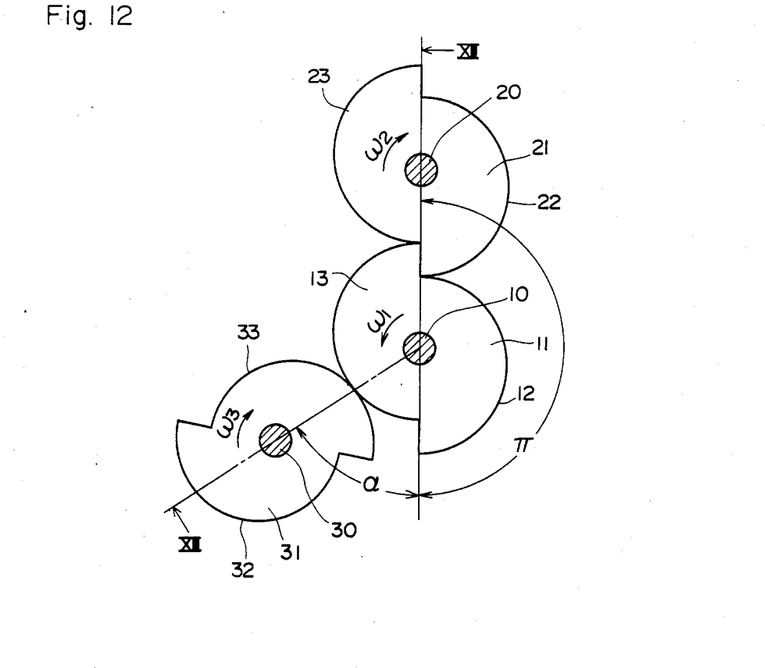
FIG. 12 is a front view of main parts of a speed change mechanism in still another modified embodiment of the invention.
Figure 13:
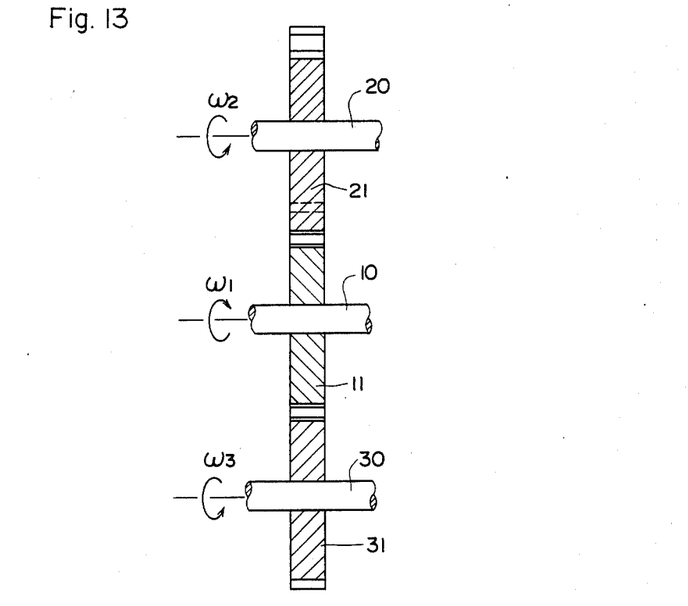
FIG. 13 is a sectional view taken on the line XIII—XIII in FIG. 12.

Referring to FIGS. 12 and 13, another modified embodiment of the invention is shown, in which the components designated by reference numeral 10 to 13 and 20 to 23 are the same ones as those shown in FIG. 9, and reference numeral 31 designates a third non-circular gear fixed to a third rotary shaft 30 and shaped as same as the second non-circular gear 21.

The third rotary shaft 30 is positioned around a first rotary shaft 10 and situated from a second rotary shaft 20 by a central angle of $(\pi+\alpha)$ radian, which is importantly meaningful. In other words, since the first non-circular gear 11 repeats the same form at every central angle of $\pi$ radian, the central angle of $(\pi+\alpha)$ radian is substantially equivalent to that of $\pi$ radian given to the same. When the rotational speeds of the first, second and third non-circular gears 11, 21 and 31 are represented by algebraic values $\omega1$, $\omega2$ and $\omega3$, the functions thereof are given in the following algebraic expressions:

$$\omega2=-\omega1\cdot e^{K\cdot\theta}\cdot F(O)$$

and $$\omega3=-\omega1\cdot e^{K(\theta+\alpha)}\cdot F(O)$$

whereby the expression $\omega3/\omega2=e^{K\cdot\alpha}$ of the rotational speed is obtained from the aforesaid both expressions. The rotational speed expression $\omega3/\omega2=e^{K\cdot\alpha}$ indicates the property applicable to the continuously variable transmission to be produced by applying thereto the present invention.

Figure 14:
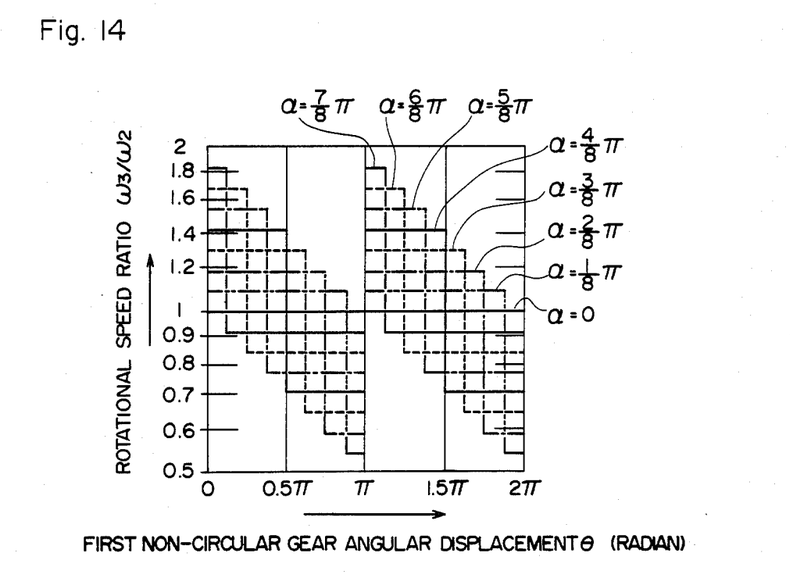
FIG. 14 is a graph explanatory of the curves showing a rotational speed ratio of second and third non-circular gears with respect to the first non-circular gear in FIG. 12.

In FIG. 12, when the central angle $\alpha$ indicating the position of non-circular gear 31 with respect to the non-circular gear 21 is given as a variable value, variation in the rotational speed ratio between both the non-circular gears 21 and 31 is shown in FIG. 14, which shows that the constant value continuously appears in the rotational speed ratio $\omega3/\omega2$ in a combination using the pairs of non-circular gears and the rotational speed ratio varies in correlation with the value $\alpha$.

In order to construct the actual gear type continuously variable transmission by use of the modified embodiment of the invention, means for variably controlling the central angle $\alpha$, constant speed applying means for picking up only the constant value portion from the variation pattern of the rotational speed ratio, and means for devising the continuous intermeshing of the gears with each other at the same rotational speed ratio, need only be adopted, these means including various kinds of combined mechanisms.

Figure 15:
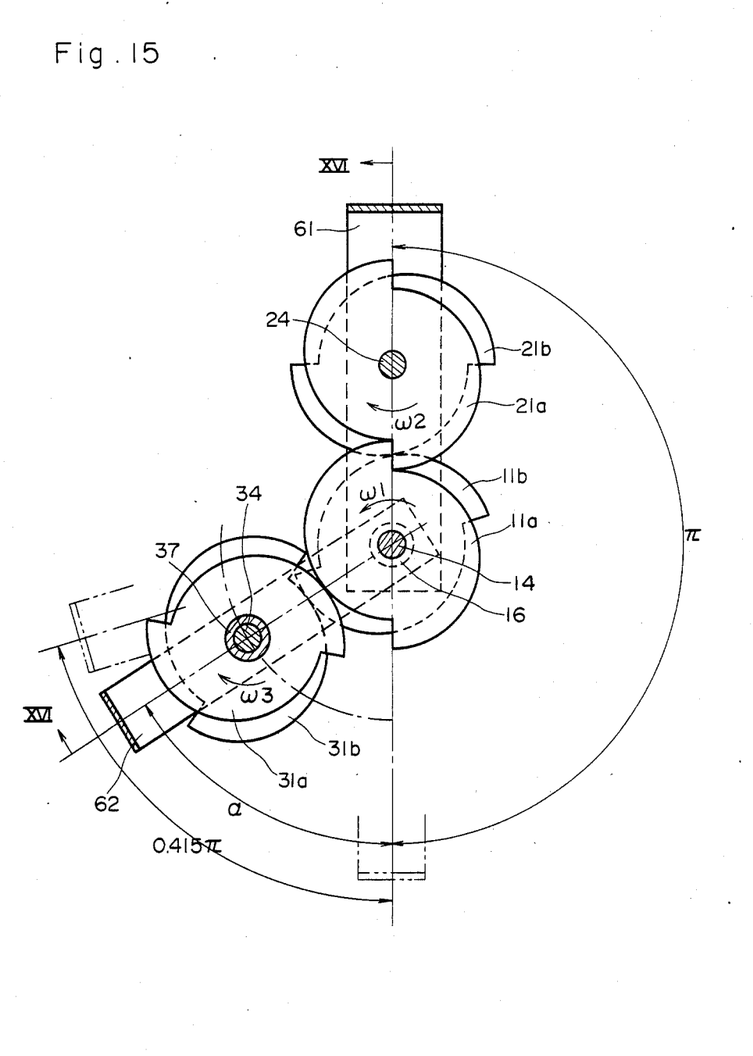
FIG. 15 is a partially sectional front view taken on the line XV—XV in a further modified embodiment of the invention in FIG. 16.
Figure 16:
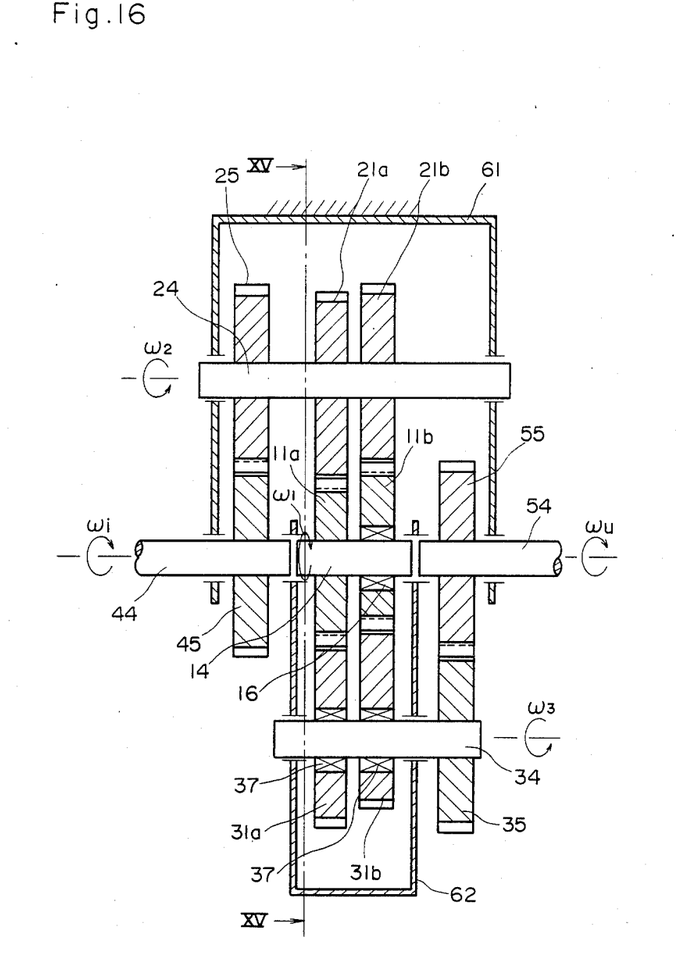
FIG. 16 is a sectional view taken on the line XVI—XVI in FIG. 15.

Referring to FIGS. 15 and 16, a further modified embodiment of the gear transmission of the invention applying to the continuously variable transmission, in which a central angle $\alpha$ is controllable from the exterior. For constant speed control, a one-way clutch means 37 is used, and for the continuous intermeshing, the first, second and third non-circular gears 11a, 21a and 31a are used as one set and the first, second and third non-circular gears 11b, 21b and 31b are used as the other set. Reference numeral 44 designates a fourth rotary shaft which fixedly supports a circular gear 45, 24 designates a second rotary shaft which fixedly supports a circular gear 25 engageable with the circular gear 45 and second non-circular gears 21a and 21b, 14 designates a first rotary shaft which fixedly supports the first non-circular gear 11a and rotatably supports the other first non-circular gear 11b through a bearing 16, 34 designates a third rotary shaft which supports third non-circular gears 31a and 31b through one-way clutch means 37 respectively and fixedly supports a circular gear 35, 54 designates a fifth rotary shaft which fixedly supports a circular gear 55 engageable with the circular gear 35, 61 designates a fixed frame supporting the rotary shafts 44, 54 coaxially with each other and supporting the second rotary shaft 24, and 62 designates a movable frame supported to the rotary shafts 44 and 54 and supporting the rotary shaft 34 so that a central angle α of the third rotary shaft 34 around the first rotary shaft 14 with respect to the second rotary shaft 24 around the same is adapted to be continuously and variably set in an desired value.

The two second non-circular gears 21a and 21b are fixed to the second rotary shaft 24 with a π/2 radian relative angle, the one-way clutch means 37 having the unidirectional transmitting function so as to transmit torque from the non-circular gears 31a and 31b to only the rotary shaft 34 in the rotation direction as shown.

Figure 17:
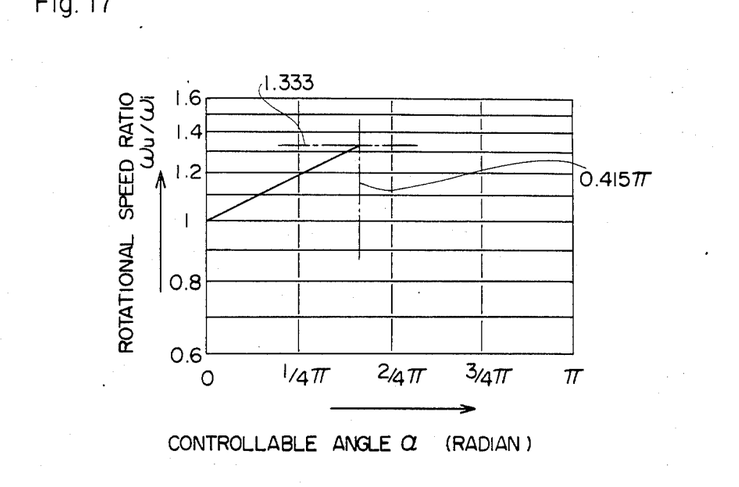
FIG. 17 is a graph of a curve showing a rotational speed ratio between fourth and fifth rotary shafts with respect to a control angle for the third non-circular gear in the embodiment in FIG. 16, and FIGS. 18 and 19 are schematic front views of non-circular gear transmissions in still further modified embodiments of the invention.

In such gear transmission, when the fourth rotary shaft 44 is given a rotational speed of ωi, a rotational speed of ωu changed by the rotational speed ratio in correlation with the controllable angle α is output from the fifth rotary shaft 54. Since the angle α is controllable in a stepless and continuous manner, the rotational speed ratio ωu/ωi shows a stepless continuous value. In addition, FIG. 17 is a characteristic graph showing the relation between the controllable angle α and the rotational speed ratio ωu/ωi.

In the above embodiments, the intermeshing curves of the first, second and third non-circular gears are explained by use of the periodic angle of π radian and repetition of the same form, but the periodic angle is not defined by the above.

All the pairs of non-circular gears such that the periodic angle of the intermeshing pitch curve of the first non-circular gear is given in 2π/m (m is a natural number) in the periodic angle of the first non-circular gear and that of the intermeshing pitch curve of the second non-circular gear is given by 2π/n (n: natural number) in that of the second non-circular gear, are applicable theoretically as an element device of the gear type continuously variable transmission mechanism applying the gear transmission of the invention.

Figure 18:
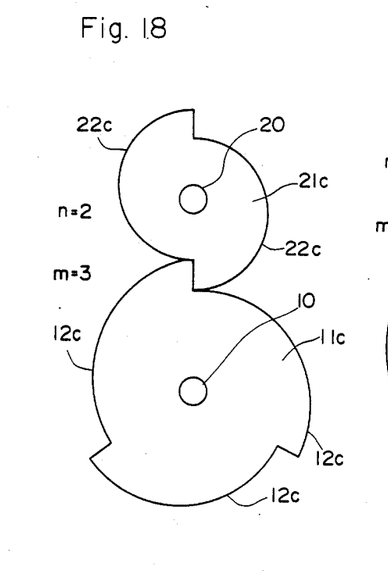
Figure 19:
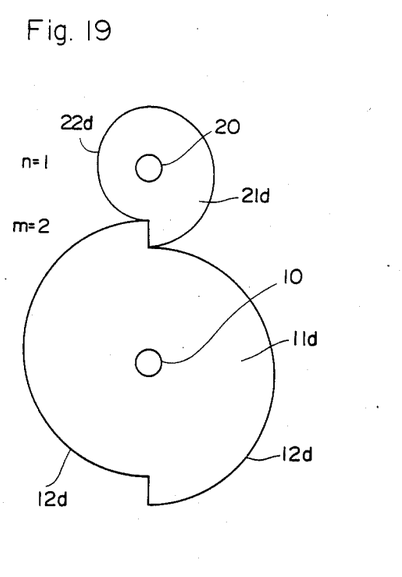

A modified embodiment of the non-circular gear transmission different in the periodic angles of both the gears are shown in FIGS. 18 and 19.

In FIG. 18, m=3 and n=2 are adopted to the periodic angles. A first non-circular gear 11c has three intermeshing pitch curves 12c in continuation with each periodic angle being 2π/3, a second non-circular gear 21c has two intermeshing pitch curves 22c in continuation with each periodic angle being 2π/2. Hence, the second non-circular gear 21c rotates half with respect to ⅓ rotation of the first non-circular gear 11c.

FIG. 19 shows the case of m=2 and n=1, in which the first non-circular gear 11d has two intermeshing curves in continuation with each periodic angle being 2π/2, a second non-circular gear 21d has one intermeshing pitch curve of a periodic angle of 2π radian. Hence, the second non-circular gear 21d once rotates with respect to ½ rotation of the first non-circular gear 11d, in other words, the second non-circular gear always rotates normally 1/n time during the normal 1/m rotation of the first non-circular gear.

In addition, in the above embodiment, the first non-circular gear is larger in diameter than the second non-circular gear so as to be m>n. Alternatively, the latter gear may be made larger in diameter than the former so as to be m<n.

As described above, according to the present invention, an element device of a continuously variable transmission using a typical gear device of a non-friction transmission therein can be composed of a smaller number of mechanical elements in comparison with the conventional device. The use of this element device leads to an effect that a mechanical continuously variable transmission having the high transmission efficiency with utilizing an advantage of a non-friction transmission can be provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A gear transmission being provided with a first rotary shaft, a first non-circular gear fixed thereto, a second rotary shaft, and a second non-circular gear fixed thereto, said first non-circular gear and said second non-circular gear being continuously engageably rotated, thereby transmitting a rotational driving force between said first rotary shaft and said second rotary shaft, said gear transmission characterized in that when the absolute value $|\omega 2/\omega 1|$ of a ratio of an angular velocity ω2 of said second rotary shaft with respect to an angular velocity ω1 of said first rotary shaft is represented by $F(\theta)$ as the function of the angular displacement θ of said first rotary shaft, an engageably rotary portion where a differential value K given in a differential equation as to said angular displacement $\theta K = d \log F(\theta)/d\theta$ presents a positive or negative constant value in continuation is provided in the shape of intermeshing pitch curves of said first non-circular gear and said second non-circular gear.

2. A gear transmission being provided with a first rotary shaft, a first non-circular gear fixed thereto, a second rotary shaft, and a second non-circular gear fixed thereto, said first non-circular gear and said second non-circular gear being continuously engageably rotated, thereby transmitting a rotational driving force between said first rotary shaft and said second rotary shaft, said non-circular gear transmission characterized in that when the absolute value $\omega 2/\omega 1$ of a ratio of an angular velocity ω2 of said second non-circular gear with respect to an angular velocity ω1 of said first non-circular gear is represented by $F(\theta)$ as the function of the angular displacement θ of said first non-circular gear, an engageably rotary portion where a differential value K given in a differential equation as to said angular displacement $\theta K = d \log F(\theta)/d\theta$ presents a constant value or an approximately constant value is provided in the shape of the intermeshing pitch curves of said first and second non-circular gears and through a range of 2π radian of the value of said angular displacement θ of said first non-circular gear.

3. A gear transmission as set forth in claim 2 wherein said engageably rotary portions where the respective differential values K present a constant value or an approximately constant value, are provided in the shapes of the intermeshing pitch curves of said first and second non-circular gears, assuming that m is the natural number, through a range of 2π/m radian in the value of angular displacement θ of said first non-circular gear, and at m-locations in continuation.

4. A gear transmission as set forth in claim 2, wherein assuming that n is a natural number, said intermeshing pitch curves of said second non-circular gear are shaped at n-locations in continuation so that said second non-circular gear always rotates once positively while said first non-circular gear is rotating the n-times.

5. A gear transmission as set forth in claim 2 or 3, wherein assuming that m and n are the natural numbers respectively, said intermeshing pitch curves of said first non-circular gear are shaped at m-locations in continuation and said intermeshing pitch curves of said second non-circular gear are shaped at n-locations in continuation so that said second non-circular gear always rotates the 1/n time while said first non-circular gear is rotating positively the 1/m time.

* * * * *